Patented June 13, 1939

2,162,150

UNITED STATES PATENT OFFICE 2,162,150

CONTROL OF AIRCRAFT

Erich Wolf, Dessau, Germany, assignor to Junkers-Flugzeug- und Motorewerke Aktiengesellschaft, Dessau, Germany Application June 20, 1936, Serial No. 86,395
In Germany July 2, 1935

9 Claims. (Cl. 244—84)

My invention relates to the means for controlling aircraft and more especially airplanes and other flying machines and has for one of its objects to render such control more reliable than hitherto.

In airplanes it is known to provide the control stations in duplicate and to connect equal parts, to be operated by the pilot, of each station with each other and with the other parts of the control in such manner that all the control surfaces can be operated either from one or the other station. This is done before all for the purpose of enabling a pilot to be readily replaced by another pilot, quite especially on long distance flights.

It is further known to provide also the power transmitting members including rods, chains, cables, shafts etc., which extend between the control levers and the control surfaces, in duplicate in order to increase the safety of flight by guaranteeing a safe control of the airplane also in the case where one of the power transmitting members might break or be destroyed by shots etc.

However even such double controls will be rendered inefficient whenever one of the power transmitting members or one of the control surfaces should jam.

In order to avoid all difficulties arising from this or other accidents, I subdivide, according to the present invention, the entire control system including the control levers, the power transmitting members and the control surfaces, into two halves in such manner that if any of the members forming part of one half should break or become useless or inoperable for some other reason, the craft may be controlled by means of the corresponding member of the other half.

I therefore subdivide all the control surfaces into two halves, which are capable of being operated and moved independently from each other. The two part elevators thus provided may be arranged in coaxial juxtaposition or in parallel superposition. Similarly the part rudders may be arranged in coaxial superposition or in parallel juxtaposition. I further provide a separate control station with the necessary controlling members (handles, levers and the like) for each half and I connect each control member of one half by means of a separate power transmission with the corresponding part control surface of the same half. I am thereby enabled to at any time operate one half of the control system from one, the other half from the other control station. I further prefer providing disengageable connections between similar parts of the two halves of the control system, the arrangement being such that during normal operation all control surfaces may be adjusted from one station, while, if any part of one half of the control system should become unfit for use, this part can be disconnected from this control station and be cut out, if necessary with the other parts to be operated with its aid, while that part of the other half of the control system, which corresponds to the cut out part, is still available for the control.

In order to further increase the safety of flight I may further subdivide corresponding members of the two halves of the control system, and more especially the power transmitting members and may disengageably couple such members with each other by their ends. I may further provide disengageable cross connections between the corresponding members of the two halves of the control system in such manner, that, if one member of one half should become unfit for use, its function may be taken upon by the corresponding member of the other half, so that the full handiness of the craft can be restored during flight.

In the drawings affixed to this specification and forming part thereof two control systems for aircraft embodying my invention are illustrated diagrammatically by way of example.

In the drawings

Figure 1:
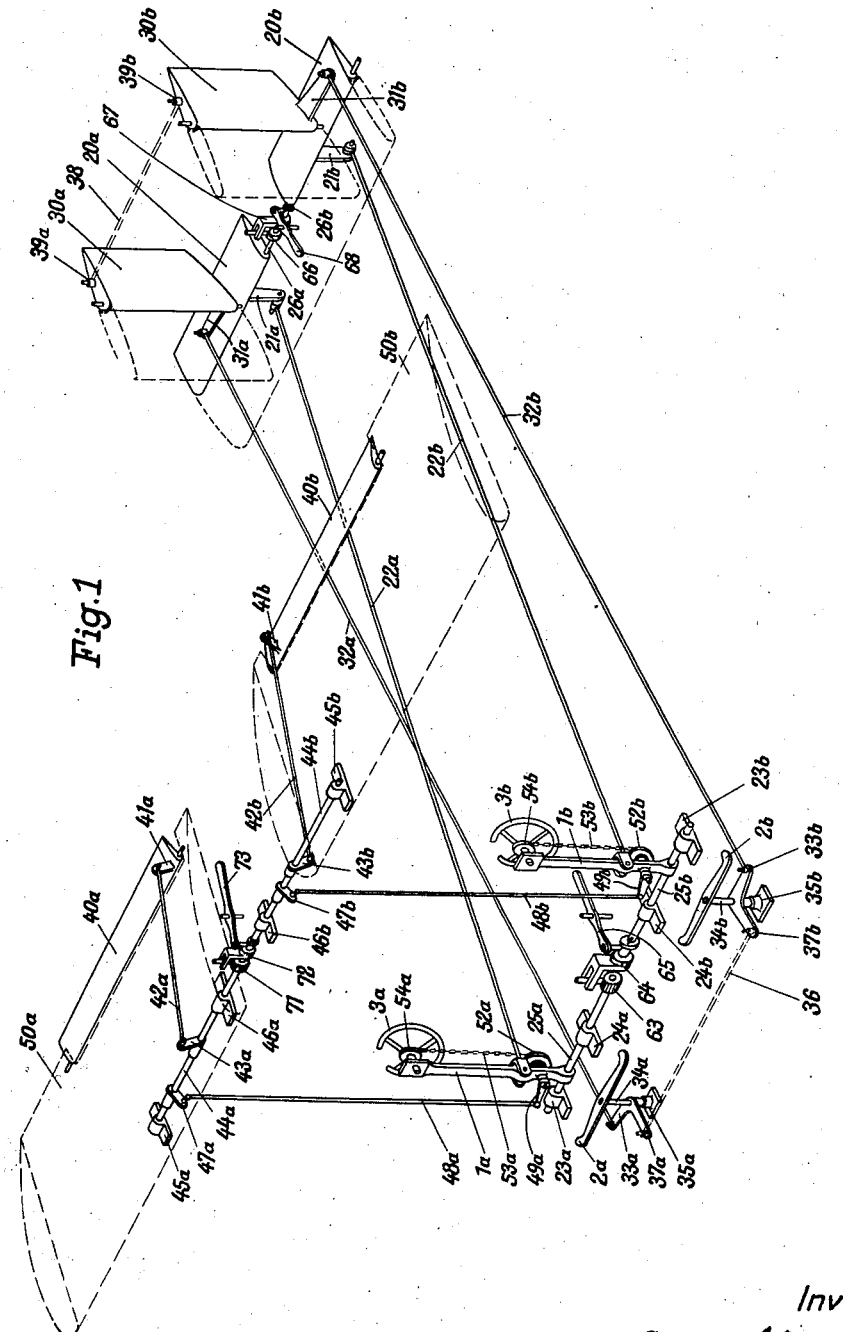
Fig. 1 is a perspective diagrammatic showing of a control system of an airplane.

Referring to the drawings and first to Fig. 1, the control system here shown is subdivided into two halves, each of which forms in itself a complete control. Two control stations, each provided with the required control members, are provided, these control members comprising a rock lever $1a$ and $1b$ for the elevators, a pedal lever $2a$ and $2b$ for the rudders and a hand wheel $3a$ and $3b$, respectively for the ailerons.

The elevator is subdivided into the part elevators $20a$ and $20a$, the rudder into the part rudders $30a$ and $30b$. The ailerons are formed in a well known manner by two surfaces $40a$ and $40b$ rockable in opposite sense. The part elevators $20a$, $20b$ are connected by means of the rods $22a$, $22b$ pivoted to the elevator levers $21a$, $21b$ with the rock levers $1a$, $1b$, which are fixed to the shafts 25a, 25b supported in the bearings 23a, 23b and 24a, 24b, respectively. The part rudders 30a, 30b are connected by means of the rods 32a, 32b pivoted to the rudder levers 31a, 31b with lever arms 33a, 33b, which are fixed on the pivots 34a, 34b of the pedal levers 2a, 2b. These pivots are supported in bearings 35a, 35b, respectively, fixed on the craft.

The ailerons 40a, 40b are connected by means of the rods 42a, 42b pivoted to the aileron levers 41a, 41b with lever arms 43a, 43b, which are fixed on separate shafts 44a and 44b, respectively. These shafts are supported in bearings 45a, 45b and 46a, 46b, respectively, fixed to the craft. On the shafts 44a, 44b are further fixed lever arms 47a, 47b, which are connected by rods 48a, 48b with lever arms 49a, 49b, which are located in bearings at the bottom ends of the rock levers 1a and 1b, respectively, their axles carrying sprocket wheels 52a, 52b, which are connected by means of chains 53a, 53b with the sprocket wheels 54a, 54b fixed to the hand wheels 3a and 3b, respectively, supported by the rock levers. By turning one of these hand wheels the corresponding aileron is operated.

Between similar control members and/or part control surfaces of the two halves of the control system couplings are inserted. In the elevator control is inserted a clutch consisting of the halves 63, 64 and a clutch operating lever 65 for the coupling of the rock lever shafts 25a and 25b. A similar clutch device 66, 67, 68 is provided between the axles 26a, 26b of the part elevators 20a and 20b, respectively. In the aileron control a similar clutch device 71, 72, 73 is inserted between the shafts 44a and 44b. In the rudder control coupling rods are provided, one of which (36) connects the lever arms 37a, 37b fixed on the pedal lever pivots 34a, 34b, respectively, while another coupling rod 38 is attached to pins 39a, 39b of the part rudders 30a, 30b. As a rule these couplings and clutch devices are thrown in and the entire control system may then be operated from one or the other control station. However, when the danger arises that during flight any member might be damaged or destroyed, the connections 66, 67 and 38 between the two part elevators and the two part rudders are severed. On the other hand the connections 63, 64 and 71, 72 as well as 36 remain at first operative so that the craft can be further operated from any one of the two control stations. If now a part of the system, for instance the part elevator 20a, should be rendered inoperative, the consequence of jamming, during flight, the connection between the corresponding halves (the clutch 63, 64 between the rock levers 1a and 1b of the part elevators 20a, 20b) is severed and the safe control member (part elevator 20b) is adjusted by itself from the control station (rock lever 1b) apportioned to it.

While the craft is now less readily controllable, the available control still suffices to avoid a fall or a forced landing.

If during the flight some part of the power transmission, for instance the elevator rod 22a, should break, the part elevator 20a will at first become inoperative. By throwing in the clutch 66, 67 this part elevator can however be coupled with the part elevator 20b and serve further to control the craft.

Figure 2:
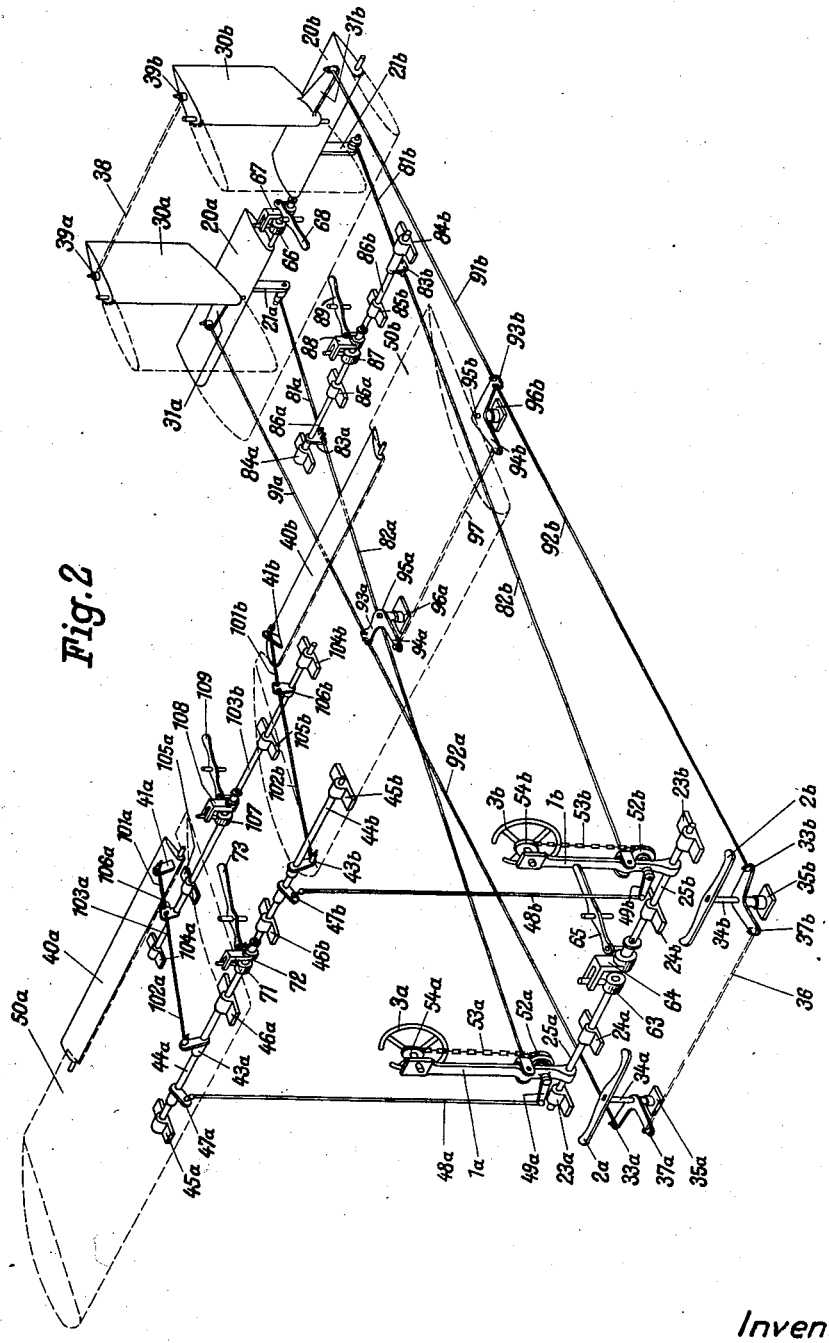
Fig. 2 is a similar showing of a similar system, in which however the power transmissions of each half are subdivided and the divisional members of one half are arranged to be coupled with divisional members of the other half.

The control system illustrated in Fig. 2 is similarly subdivided into two halves, each of which constitutes a complete controlling system. The parts already shown in Fig. 1 are here marked with the same reference numerals. In this modification also the single power transmission systems are subdivided and the members of these power transmission systems in one half can be coupled with members of corresponding power transmissions of the other half, so that in case of need, if a power transmitting member of one half of the system should be destroyed, its function can be fulfilled by the corresponding member of the other half.

The power transmission to the elevators is here effected by means of the rods 81a, 81b and 82a, 82b, respectively, which connect the lever arms 21a, 21b fixed to the part elevators 20a, 20b with the rock levers 1a, 1b. The adjoining ends of the rods 81a, 81b and 82a, 82b are pivotally connected to the lever arms 83a, 83b, which are secured against rotation on the shafts 86a, 86b supported in bearings 84a, 84b and 85a, 85b, respectively, fixed to the craft. Between the shafts 86a, 86b is inserted a clutch device 87, 88, which can be thrown in and cut by means of a lever 89. The power transmission to the part rudders is effected by means of rods 91a, 91b and 92a, 92b, which connect the lever arms 31a, 31b of the part rudders 30a, 30b with the lever arms 33a, 33b secured to the axles 34a, 34b of the pedal levers 2a, 2b, respectively. Between the adjoining ends of these rods are pivotally inserted the lever arms 93a, 93b of the bell crank levers 93a, 94a and 93b, 94b, respectively, which are supported for rotation on the pivot pins 95a, 95b mounted in bearings 96a, 96b fixed to the fuselage. The lever arms 94a, 94b of the bell crank levers may be connected by a coupling rod 97.

The members for transmitting power to the ailerons, which connect the lever arms 41a, 41b of the ailerons 40a, 40b with the intermediate lever arms 43a, 43b coupled with the control members (hand wheels 3a, 3b) are formed by rods 101a, 101b and 102a, 102b, respectively. The adjoining ends of these rods are pivotally connected with levers 106a, 106b mounted on the shafts 103a, 103b supported in bearings 104a, 104b and 105a, 105b, respectively, which are fixed to the craft. Between the shafts 103a and 103b is inserted a clutch 107, 108 which can be thrown in and out by means of a lever 109.

If, during flight, a member of one of the power transmitting systems, for instance the member 82b of the power transmission to the part elevator on the backboard side, should become inoperative, the full control over the craft can be restored either by establishing a connection between the two part elevators, for instance by throwing in the clutch device 66, 67 inserted between the two part elevators 20a and 20b, or by establishing a connection between the respective power transmitting systems, for instance by throwing in the clutch 87, 88. Since now the elevator control is effected only from one control station by means of the rock lever 1a on the starboard side, it is recommendable to arrest the rock lever 1b of the other control station by throwing out the clutch 63, 64. Besides this the broken power transmitting member 82b may be severed from the other control members connected to it (rock lever 1b and lever arm 83b). In this manner the danger is avoided that by a jamming of the broken member the other control members might be immobilized.

In the case that during flight different members of similar parts of the two halves of the control system, for instance a member of the power transmission (such as member 82b of the elevator control) in one half and a control surface (for instance the part elevator 20a) of the other half of the system should be destroyed, it is recommendable to first connect the intact parts of the power transmissions of the two halves (member 82a of the elevator control of one half and member 81b of the elevator control of the other half) with each other by means of the auxiliary clutch 87, 88 provided between the adjoining ends of the parts of these power transmission systems in such manner that they now transmit power between the rock lever 1a connected to the intact part 82a of the power transmission and the intact part elevator 20b. Besides this the connection between the rock levers of the two halves of the control system may be severed by throwout the clutch 63, 64.

Thus the control of the control surfaces of the craft is here rendered possible also in the case when different members of the two halves of the double control system have become inoperative.

I wish it to be understood that I do not desire to be limited to the exact details of construction shown and described for obvious modifications will occur to a person skilled in the art.

I claim:

1. In an aircraft having a pair of duplicate control surfaces, disengageable coupling means directly operative between said control surfaces comprising one clutch element on one said surface and a cooperating clutch element on the other said surface, means for readily disengaging said coupling means, a control member, and power transmission mechanism between said control member and one of said control surfaces whereby the other control surface may be actuated by said control member or remain inoperative.

2. In an aircraft having two separate control systems, each of which comprises a control member, power transmission and a control surface, disengageable coupling means directly operative between said control surfaces comprising one clutch element on one said surface and a cooperating clutch element on the other said surface, and means for readily disengaging said coupling means whereby the control surface of both systems may be operated from either control member.

3. In an aircraft having two separate control systems, each of which comprises a control member, power transmission and a control surface, disengageable coupling means directly operative between the control surfaces and disengageable coupling means between the power transmissions for interchangeably operating the control surfaces of each system from either or both control members, said coupling means comprising cooperating clutch elements associated with the parts to be coupled, respectively, and means for readily disengaging each of the coupling means.

4. Mechanism as described in claim 3 wherein the power transmissions between the two control members and respective duplicate control surfaces are disengageably coupled intermediate the control members and the control surfaces whereby all control surfaces may be operated from one control member on breakage of the transmission mechanism extending from the other.

5. In an aircraft having two separate control systems, each of which comprises a control member, power transmission and a control surface, disengageable coupling means directly operative between said control surfaces and disengageable coupling means directly operative between said control members for interchangeably operating the control surface of each system from either or both control members, said coupling means comprising cooperating clutch elements associated with the parts to be coupled, respectively, and means for readily disengaging each of the coupling means.

6. In an aircraft having two separate control systems each of which comprises a control member, power transmission and a control surface, a disengageable coupling directly operative between the power transmissions of the two systems at points intermediate the control members and the control surfaces, and a disengageable coupling directly operative between the control surfaces, said couplings comprising cooperating clutch elements associated with the parts to be coupled, respectively, and means for readily disengaging each of the couplings.

7. In an aircraft having two separate control systems each of which comprises a control member, power transmission and a control surface, a disengageable coupling directly operative between the power transmissions of the two systems at a point intermediate the control members and the control surfaces, a disengageable coupling member between the control members, and a disengageable coupling directly operative between the control surfaces, said couplings comprising cooperating clutch elements associated with the parts to be coupled, respectively, and means for readily disengaging each of the couplings.

8. In an aircraft having two separate control systems each of which comprises a control member, a plurality of pairs of duplicate control surfaces and power transmission mechanism between each control member and one duplicate control surface of each pair, a disengageable coupling directly operative between the duplicate control surfaces of each pair, and a disengageable coupling directly operative between the control member of each system, said couplings comprising cooperating clutch elements associated with the parts to be coupled, respectively, and means for readily disengaging each of the couplings whereby one of any pair of control surfaces may be rendered inoperative while permitting actuation of all the remaining control surfaces of each system by the control member associated with the other control surface of the pair.

9. Mechanism as described in claim 8 wherein the power transmissions between the two control members and respective duplicate control surfaces are disengageably coupled intermediate the control members and the control surfaces whereby all control surfaces may be operated from one control member on breakage of the transmission mechanism extending from the other.

ERICH WOLF.